Aug. 22, 1967  G. D. ROCKEFELLER, JR  3,337,774
DIRECTIONAL COMPARISON PILOT RELAYING
Filed May 26, 1965  3 Sheets-Sheet 1

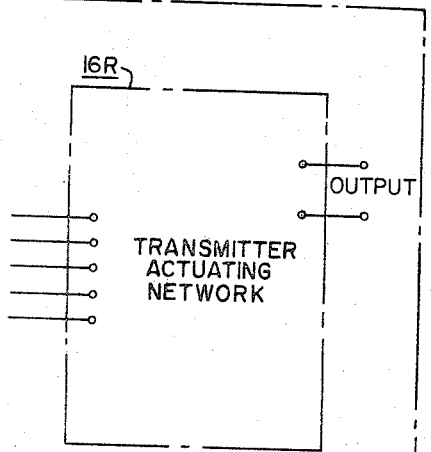
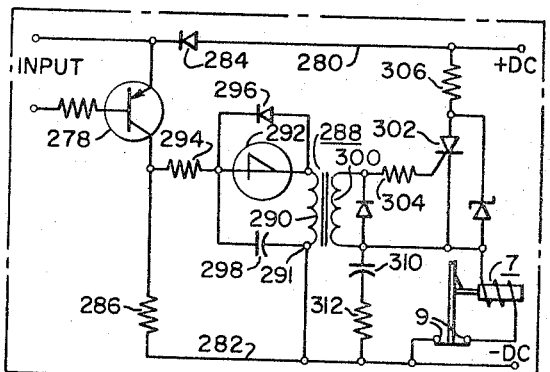
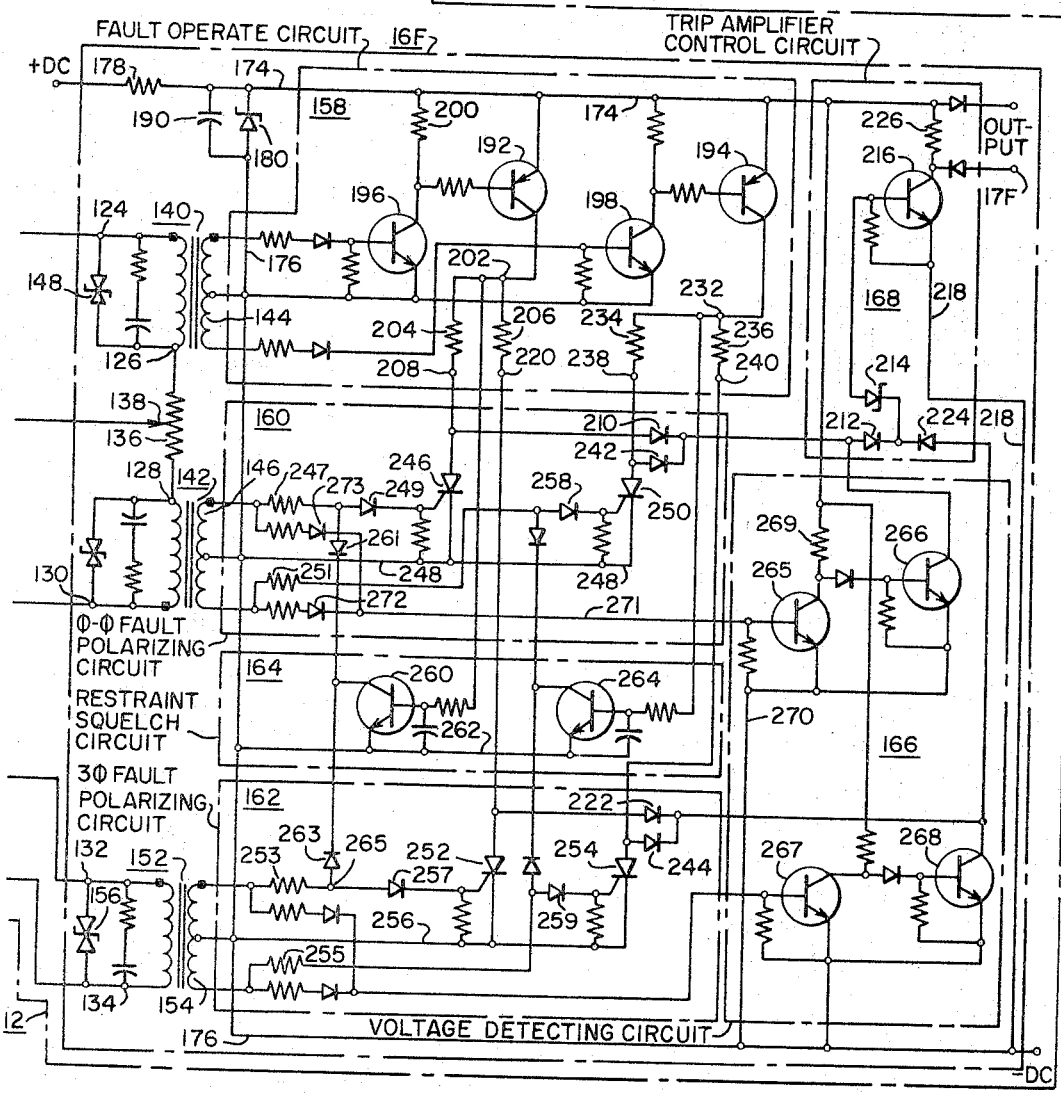
FIG.9.
FIG.3B.

Patented Aug. 22, 1967

3,337,774
DIRECTIONAL COMPARISON PILOT RELAYING
George D. Rockefeller, Jr., Morris Plains, N.J., assignor to Westinghouse Electric Corporation, Pittsburgh, Pa., a corporation of Pennsylvania
Filed May 26, 1965, Ser. No. 458,939
7 Claims. (Cl. 317—36)

This invention relates generally to relaying apparatus and more particularly to a directional comparison pilot relaying system embodying distance relays for detecting faults. In static distance relays, such as for example those disclosed in the copending application of Howard J. Calhoun, filed May 17, 1965, for Static Directional unit, Ser. No. 456,209, and assigned to the same assignee as is this application, the time interval between the time that the fault occurs on the power network and the time that the output circuits of the directional units are actuated can vary as much as one-half cycle of the power frequency of the network which is being protected. When this directional unit is used in a directional comparison pilot relaying system a sufficient time must elapse between the time that the relay at one station is actuated and the time that the breaker is tripped to permit the distance relaying unit at the far station to actuate and send a signal back to the first station in the event that the fault is external to the line section of the network being protected by the static directional unit. This time interval must of necessity be equal to the maximum time interval required by the static directional unit at the far end of the line to be actuated and cause its transmitter to transmit a signal to the local relaying unit. This delay, when measured in terms of the 60-cycle frequency normally used in alternating potential transmission lines in the United States, should be about 8 milliseconds. This 8-millisecond delay when added to a second 8-millisecond delay inherent in the static relaying unit makes the time interval for tripping the breaker amount to from one-half to one full cycle depending upon the point in the operating cycle of the protected network that the fault occurs. A full cycle delay, under some operating circumstances, may well result in an undue amount of damage to the faulted network.

It is therefore an object of this invention to provide means to decrease the delay time for operating the breaker in response to a fault occurring in the protected line section.

A further object of this invention is to maintain this delay interval at a magnitude which is not substantially in excess of the maximum delay interval of the static directional unit.

Other objects of this invention will be apparent from the written description, the appended claims and the drawings in which:

Figure 4:
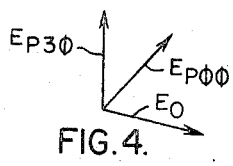
Figure 5:
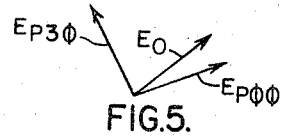
Figure 6:
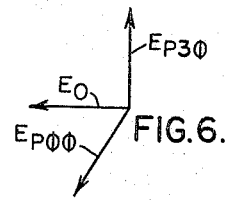
Figure 7:
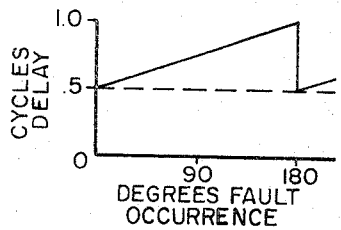
Figure 8:
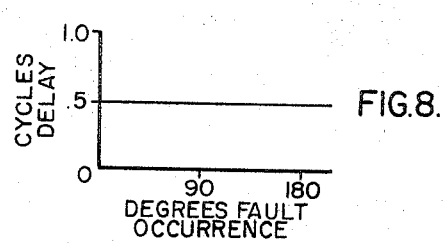
Figure 3A:
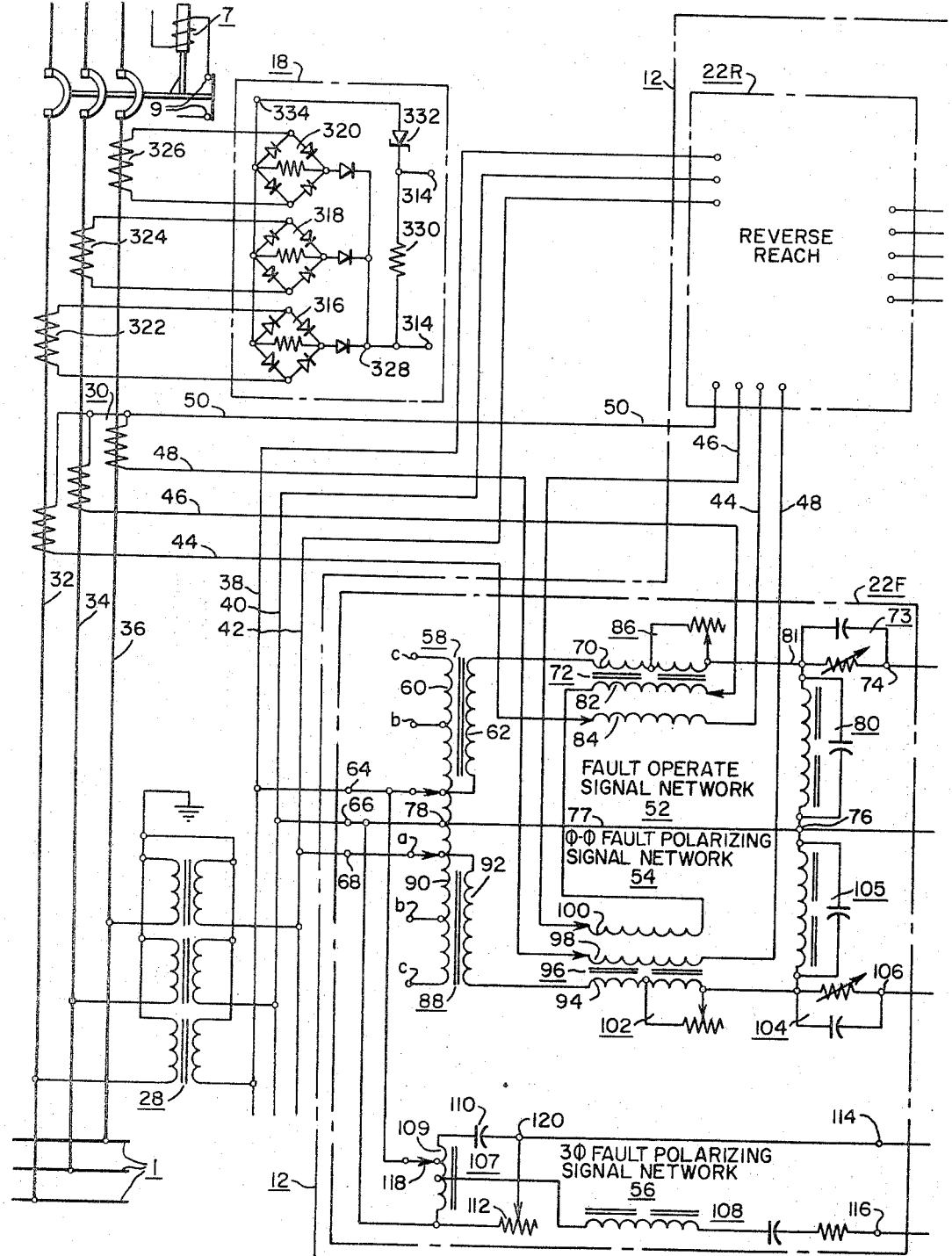

FIGS. 3A and 3B schematically illustrate the distance relay which may be used in the practice of the invention;

FIGS. 4, 5 and 6 are vector diagrams illustrating the operation of the static directional unit illustrated in FIGS. 3A and 3B;

FIG. 7 is a diagrammatic view illustrating the time delay imparted by the static directional unit of FIGS. 3A and 3B when related to the time of the occurrence of the fault in the cycle of the power network;

FIG. 8 is a view similar to FIG. 7 showing the time delay which occurs when utilizing the invention; and, FIG. 9 is a diagrammatic view showing a tripping relay which may be used to actuate the trip coil of the breaker mechanism.

Figure 1:
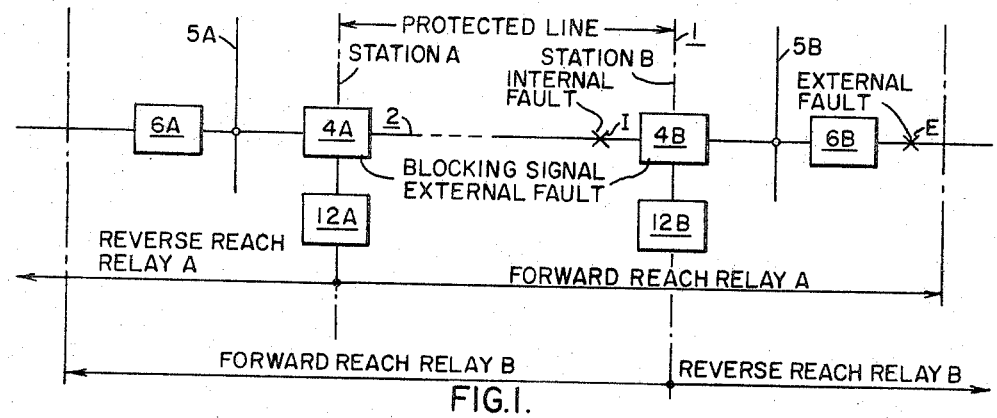
FIGURE 1 is a diagrammatic representation of a power network having a protected line embodying the teachings of this invention.

Referring to the drawings by characters of reference and more particularly to FIG. 1 wherein there is illustrated in single line diagram a portion of a power distribution network 1 having a protected line section 2 connected at opposite ends by breakers 4A and 4B to busses 5A and 5B. These busses are provided with additional line sections connected thereto by means of the breakers 6A and 6B. The breakers 4A and 4B may be actuated to their open condition by means of trip coils and an amplifying network. Since both breakers 4A and 4B are identical as are the amplifying network which actuate the same, only a single amplifying network 8 is illustrated (FIG. 9). Where reference is made to a particular breaker the subscript A or B will be utilized. When they are referred to generally the subscript will be omitted and it will be understood that reference may be made to either thereof.

Upon energization of the breaker trip coil 7, the breaker 4 will open its main contacts as well as its pliot contacts 9 located at station A. Stations A and B are provided with distance relays 12A and 12B respectively, which actuate the breakers 4A and 4B respectively. The distance relay 12 is shown and described in the copending application of Howard T. Calhoun, above referred to.

The distance relay 12, unlike the relay specifically shown in the copending Calhoun application, includes a rearward reaching logic or fault sensing network and trip coil actuating network as well as the forward reaching network, and comprises the actuating networks 16F and 16R and the distance logic or fault sensing networks 22F and 22R. The forward reaching sensing networks 22F and 22R are identical and only one thereof is shown in detail. The only difference between the networks 22F and 22R is the direction in which the current flows therethrough; it flows through the forward sensing network 22F in a forward direction, and the rearward sensing network 22R in the opposite direction. The trip coil actuating networks 16F and 16R are substantially identical except that the trip coil actuating network 16R preferably omits the voltage detecting circuit (transistors 267 and 268 and the associated circuitry) which is actuated by the three-phase fault polarizing circuit. With this omission, a drop in voltage at the location of the relaying apparatus will result in energization of the output terminals of the trip coil actuating network 16R. The magnitude of the signal from fault operate network will be sufficient since the operate network will be energized from the compensator 72.

Figure 2:
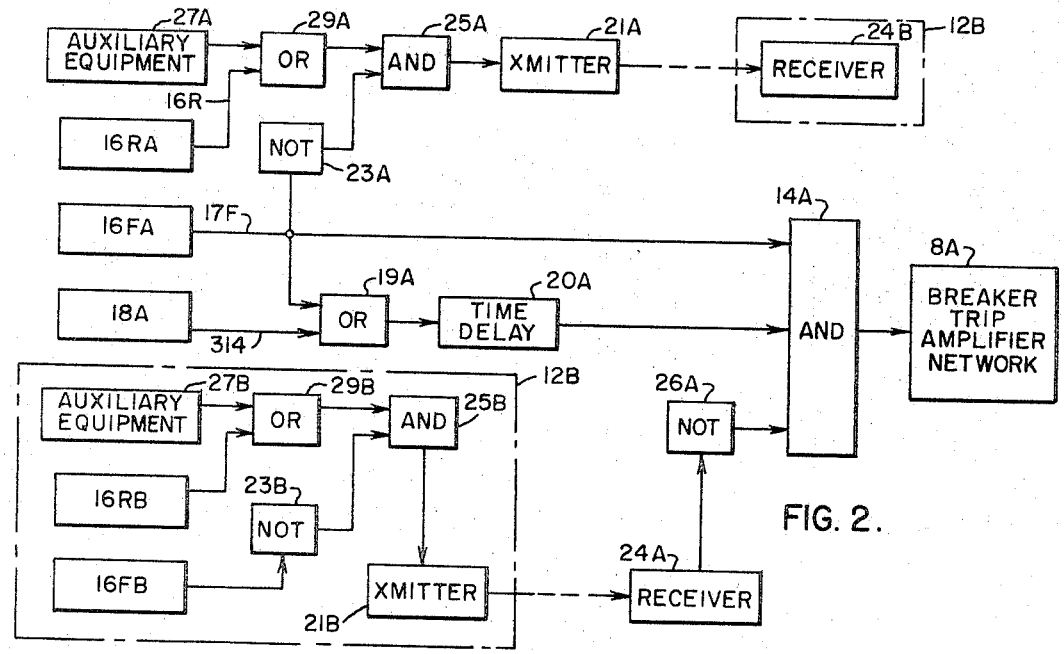
FIG. 2 is a block diagram illustrating the invention when applied to a directional comparison relaying system.

As illustrated in FIG. 2, the output terminals 17F are connected to one of the inputs of an AND network 14 and to one of the inputs of an OR network 19A. The output of the OR network 19A is connected to the input of a time delay network 20 which has its output connected to the second input of the AND network 14. A second fault responsive network 18 which may be an overcurrent network as illustrated (in FIG. 3A) and which preferably has no time delay is connected to the second input terminal of the OR circuit 19. The output circuit 17R of the transmitter actuating network 16R is connected to the control input of a carrier frequency transmitter 21 which is effective to transmit and refrain from transmitting a carrier frequency along the protected line section 2 to the receiver 24B of the relaying apparatus at the B station depending upon the energized condition of the output circuit 17R. The relaying apparatus at the A station includes a receiver 24A which is actuated by a transmitter 21B under control of a transmitter actuating network 16RB of the relay 12B.

The output of the receiver 24A is connected to the input circuit of a NOT circuit 26A which has its output connected to the third input circuit of the AND network 14. The output circuit of the AND circuit 14 is connected to the input of the breaker trip amplifying network 8A whereby the breaker is actuated to open circuit operation upon the occurrence of three input signals to the AND circuit 14.

The potential and current signals for actuation of the logic or fault sensing networks 22F and 22R are derived from a potential transformer array 28 and a current transformer array 30 which are energized respectively from the three-phase conductors 32, 34 and 36 of the protected line section 2. The transformer array 28 has its primary winding connected in WYE to the conductors 32, 34 and 36 and its secondary windings connected in WYE to the potential control busses 38, 40 and 42. The neutral terminals of both the primary and secondary windings are preferably grounded as illustrated. The potential derived electrical quantities appearing between the conductors 38, 40 and 42 are phased so that the vector quantities representing these quantities have the same relation with respect to each other as the vector quantities representing the voltages of the supply conductors 32, 34 and 36.

The current transformer array 30 comprises three WYE connected current transformers associated with the three conductors 32, 34 and 36, respectively, and develop current derived quantities which are representative of the current flowing in the protected line section 2. The phase rotations should be 32–34–36. These transformers energize individual current quantity conductors 44, 46 and 48. A common quantity conductor 50 is connected to a neutral connection of the array 30.

The distance logic or fault sensing networks 22F and 22R are identical and comprise a fault operate signal network 52, a line-to-line fault polarizing signal network 54 and a three-phase fault polarizing signal network 56 energized from the potential and current derived quantities supplied from the voltage and current transformer arrays 28 and 30.

The potential quantity is supplied to the fault operate signal network 52 through a transformer 58 having a tapped primary winding 60 energized from first and second quantity input terminals 64 and 66 connected respectively to the busses 38 and 40. By a suitable selection of the tap of the windings 60, the volts per turn of a secondary winding 62 may be determined and thereby the magnitude of the potential quantity supplied to the network 52 relative to the potential between the conductors 32 and 34. This in combination with the adjustment of the turns of the windings 82, 84, 98 and 100 determine the reach of the distance relay.

The transformer 58 may serve to isolate the network 52 from the conductors or one terminal of the winding 62 may be connected as shown to an intermediate tap of a secondary winding 60 to reduce the turns required by the winding 62 in autotransformer fashion. The other terminal of the winding 62 is connected through the output winding 70 of a compensator 72 and a transient supressing network 73 to one output control terminal 74 of a first pair of output terminals 74–76 of the distance logic network 22F. The second control terminal 76 is connected by a conductor 77 to a common terminal 78 of the winding 60 of transformer 58 and winding 90 of a transformer 88. The terminal 78 is connected to the input terminal 66. If desired, a transient suppressing network 80 may be connected between the output terminal 76 and the common connection 81 of the winding 70 and the transient suppressing network 73.

The compensator 72 may take the form of a transformer having a core with an air gap, sometimes known as a mutual inductance, and having compensating windings 82 and 84 inductively coupled by means of the core to the output winding 70. The compensator 72 vectorially adds the quantities applied to windings 82 and 84 to provide a current derived summed quantity for modifying the potential quantity supplied by the transformer 58. This summed quantity is phase shifted by the predetermined characteristic phase angle of the branch network or line 2 by a phase shifting arrangement 86 to phase the compensating quantity applied to the output terminals of the winding 70. The compensator 72 provides a compensating output quantity for addition to the potential derived quantity as may be represented by the vector $V_{C1}$ of the said copending Calhoun application. The phase shifting arrangement 86 may take the conventional form of a resistor shunting a portion of the winding 70.

The line-to-line fault polarizing signal network 54 is similar to the fault operate signal network 52 and comprises the transformer 88 having the tapped winding 90 and a secondary winding 92. The adjustable tap of the winding 90 is connected to the third input terminal 68 which is connected to the conductor 42. The other terminal of winding 90 is connected to the common terminal 78 and thereby to the second potential input terminal 66.

One end of the winding 92 is connected to a tap on the winding 90 and the other end is connected through the output winding 94 of a second compensator 96 and a transient suppressing network 104 to one output control terminal 106 of a second pair of output terminals 74–106 of network 22F. The second compensator 96 like the compensator 72 is provided with compensating windings 98 and 100 and a phase shifting arrangement 102. The first control terminal of this second pair of control terminals is common with the second control terminals 76 of the first pair of control terminals. A transient suppressing network 105 may be connected between the terminals 76 and the connection between the network 104 and in winding 94.

In order to provide the desired output or compensating quantities, certain of the current derived quantities provided by the current transformer relay 30 are caused to flow through the compensating windings 82, 84, 98 and 100. The windings 82, 84, 98 and 100 of the network 22F are connected in series with the corresponding windings of the network 22R except that the current through the windings in the network 22R flow in the opposite direction. The effect of this reversal of the direction of current flow through the compensators of the network 22R with respect to the network 22F is such that the network 22F looks forwardly as indicated in FIG. 1 while the network 22R looks reversedly as also indicated in FIG. 1. The output signal at the terminals 74 and 76 has a phase relationship with respect to the output signal at the terminals 76 and 106 as illustrated by the vector diagrams of FIGS. 4, 5 and 6 for various operating conditions of the network 1. The vector $E_0$ represents the signal at the output terminals 74 and 76 while the vector $E_{P\phi\phi}$ represents the phase of the voltage signal at the terminals 76–106. The vector $E_{P3\phi}$ represents the vector which appears across the output terminals 114 and 116 of the three-phase fault polarizing signal network 56.

The three-phase fault polarizing signal network 56 comprises an impedance having a center tapped winding 109 energized from the voltage derived quantity representing the potential between the conductors 34 and 32. The winding 109 is connected between the input terminals 64 and 66. As indicated, the connection from the terminal 64 is adjustable to control the magnitude of the output potential of the nework 107. A capacitor 110 and a variable resistor 112 are connected in series between the upper and lower end terminals of the winding 108. The output potential of the phase shifting network 107 is derived from the center tap 118 of the winding 108 and the common connection or terminal 120 between the capacitor 110 and the resistor 112.

The memory network 108 comprises an inductor and a capacitor connected in series between the terminal 116 and the center tap 118. The network is tuned to the frequency of the network 1 so that it will provide a short interval of continued energization of the control terminals 114 and 116 following the termination of the voltage appearing between the conductors 32 and 34. Such a voltage termination may occur in the event of a fault between these two conductors 32 and 34 closely adjacent the stations.

The control terminals 74, 76, 106, 114 and 116 of the logic network 22F are connected respectively to input terminals 124, 126, 128, 130, 132 and 134 of the trip coil actuating network 16F. The connection from the terminals 76 to the terminals 126 and 128 includes a balancing resistor 136 having its resistor terminals connected between the terminals 126 and 128 and its movable tap 138 connected to terminal 76. The network 16F comprises three transformers 140, 142 and 152 having their primary windings individually connected between the terminals 124–126, 128–130 and 132–134, respectively. As will be brought out in greater detail below, it is desirable that the output voltages supplied by the transformers 140, 142 and 152 remain above a critical effective magnitude substantially throughout the entire 180° of each half-cycle of the voltage applied thereto and that such voltage remains within reasonable limits. A suitable wave-shape is a square wave. A convenient structure for obtaining such a voltage wave is the provision of a clipping device which will limit the magnitude of the potentials supplied to the primary windings of the transformers. As diagrammatically illustrated this is accomplished by connecting pairs of opposite poled Zener diodes 148, 150 and 156 in shunt with the primary windings of the transformers 140, 142 and 152, respectively. Transient suppressing networks comprising a capacitor connected in series with a resistor across the primary windings of these transformers may be used to eliminate or reduce the occurrence of spurious signals at the output or secondary windings 144, 146 and 154.

The trip coil actuating network 16F comprises a fault operate circuit 158, a line-to-line polarizing circuit 160, a three-phase fault polarizing circuit 162, a restrain squelch circuit 164, a voltage detecting circuit 166, and a trip amplifier control circuit 168. Unidirectional power for trip coil actuating network is provided from a suitable source of supply such as the station battery as diagrammatically indicated terminals identified by +DC and −DC. In order that the voltage between the positive and negative DC busses 174 and 176 may be held at a desired value, the bus 174 is connected to the +DC terminal through a voltage dropping resistor 178 and to negative bus 176 through a voltage regulating device which may be a Zener diode 180. A capacitor 190 is connected between the busses 174 and 176 to aid in the attainment of the constant potential therebetween.

The fault operate circuit 158 is actuated from the center tap secondary winding 144 of the transformer 140 which controls the conductive condition of the power transistors 192 and 194; the transistor 192 being rendered conductive during the positive half cycles and the transistor 194 being rendered conductive during the negative half cycles of the output signal of the transformer 140. Amplifying transistors 196 and 198 are utilized to amplify the output signals of the winding 144 and control the transistors 192 and 194.

The base of the transistor 196 is connected to the upper terminal of the winding 144 through a current limiting resistor and diode and the emitter is connected to the center tap. The collector-emitter circuit of the transistor 196 extends from the positive bus 174 through a voltage dropping resistor 200 to the negative bus 176. The control circuit of the transistor 192 extends from the positive bus 174, the emitter-base of the transistor 192, a current limiting resistor, and the collector-emitter circuit of the transistor 196 to the negative bus 176. The emitter of the transistor 192 is connected to the positive bus 174 and its collector is connected to a common terminal 202 of a pair of voltage dropping resistors 204 and 206. The resistors connect the terminal 202 to a pair of terminals 208 and 220 respectively. The terminal 208 is connected through a first diode 210, a second diode 212 and a Zener diode 214, to the base of a transistor 216 of the trip amplifier control circuit 8. The terminal 220 is connected through diodes 222 and 224 and the Zener diode 214 to the base of the transistor 216. The emitter of the transistor 216 is connected by a conductor 218 to the negative bus 176 and the collector is connected through a voltage establishing resistor 226 to the positive bus 174.

When transistor 216 conducts, a signal will be established between the output terminals 17F which are connected to the input terminals 10 of the amplifier network 8 through the AND circuit 14 and through the OR circuit 19. As will be described below, the conduction of the transistor 216 results in the supplying of a signal directly to one input terminal of the AND circuit 14 and to one input terminal of the OR circuit 19 whereby after a suitable time delay as determined by the time delay 20.

The transistor 194, which functions during the opposite half cycle to the transistor 192, has its emitter connected to the bus 174 and its collector connected to a common terminal 232 or a pair of resistors 234 and 236. The other end terminals of the resistors are connected to terminals 238 and 240 respectively. The terminal 238 is connected through diodes 242, 212 and 214 to the base of the transistor 216. Similarly, the terminal 240 is connected through diodes 244, 224 and 214 to the base of the transistor 216.

Conduction of the transistor 194 is controlled by the transistor 198 and for this purpose the base thereof is connected to the negative bus 176 through the collector of the transistor 198 and the usual current limiting resistor. The base of the transistor 198 is connected through a diode and current limiting resistor to the lower end terminal of the transformer winding 144 and its emitter is connected directly to the center tap connection thereof.

In order to prevent energization of the output circuit 17F except in response to a fault within the forward reach of the relay, the terminals 208, 220, 230 and 240 are selectively connected directly to the negative bus 176 by the polarizing circuits 160 and 162 in shunt with the base circuit of the transistor 216. These shunt circuits inevitably have some resistance therein, a Zener diode 214 is selected which has a breakover potential which is in excess of such voltage drop. This assures that no base current will flow to the transistor 216 from any of the terminals 208, 220, 230 and 240 which are shunted to the negative bus 176.

The shunt circuit for the terminal 208 extends therefrom through a discontinuous type control device 246 such as a silicon controlled rectifier and a branch bus 248 to the negative bus 176. The shunt circuit for the terminal 238 extends therefrom through another discontinuous control device 250 such as a silicon controlled rectifier and a bus 248 to bus 176. Likewise, the shunt circuit for the terminals 220 and 240 extend through discontinuous control valves 252 and 254 respectively which may also be silicon controlled rectifiers and a branch bus 256 of the three-phase fault polarizing circuit 162 to the negative bus 176.

As will be brought out more clearly below, the normal operation of the relaying controlling apparatus with an unfaulted condition within its reach is such that the phase of the output signals of the transformers 142 and 152 lead the phase of the output signal of the transformer 140 whereby the controlled rectifiers 246, 250, 252 and 254 are gated into a conductive condition prior to the time that the transistors 192 and 194 are rendered conducting. With such a phasing, the potential of the terminals 208, 238, 220 and 240 cannot increase substantially above ground potential when the transistors 192 and 194 actually conduct. The transistor 216 will therefore remain nonconducting and no output will be applied at the output terminals 17F to actuate either the AND circuit directly or the OR circuit 19. The breaker trip circuit 8A cannot actuate the trip coil 7 to open the breaker 4.

The gate of the controlled rectifier 246 is connected to the upper terminal of the winding 146 through a current limiting resistor 247 and a diode 249 while the cathode is connected to the center terminal through a bus 248. A usual shunting resistor shunts the gate and cathode. The gate of the controlled rectifier 250 is connected to the lower terminal winding 146 through another current limiting resistor 251 and a diode 258 and the cathode is connected to the branch bus 248. A shunting resistor is connected between the gate and cathode of the rectifier 250. During the periods in which the upper terminal of the winding 146 is positive with respect to the center tap connection, the gate of the controlled rectifier 246 will be maintained in condition for anode to cathode conduction of the controlled rectifier 246 upon the conduction of the transistor 192 and similarly the periods in which the lower terminal of the winding 146 is positive with respect to the center tap, the controlled rectifier 250 will be in readiness to conduct upon conduction of the transistor 194. The controlled rectifiers 246 and 250 are the discontinuous control type and when once rendered conductive they will conduct as long as anode cathode voltage is maintained thereacross. Therefore these controlled rectifiers 246 and 250 will continue to conduct and hold the terminals 208 and 238 substantially at ground potential for the time period that the transistors 192 and 194 conduct even though the gate signal subsequently terminates.

Similarly, the controlled rectifiers 252 and 254 have their gate and cathode circuits connected to the transformer winding 154 through resistors 253 and 255 and through diodes 257 and 259 whereby these rectifiers are rendered in a conducting condition whenever the transformer 152 is energized. These rectifiers 252 and 254 act in a manner similar to the rectifiers 246 and 250 and maintain the companion terminals 220 and 240 substantially at ground potential when they conduct.

The restraint squelch circuit 164 is provided to shunt the gate current from the controlled rectifiers 246 and 250 in instances in which the transistors 192 and 194 are rendered conducting prior to the rendering of the controlled rectifiers 246 and 250 conducting. The restraint squelch circuit 164 includes two transistors 260 and 264 which have their base-emitter circuits connected between the terminals 220 and 240 and the negative bus 176 through the usual current limiting resistors. The collector of the transistor 260 is connected to the common connection of the resistor 247 and diode 249 through a diode 261. This same collector is also connected to the common connection 265 of the resistor 253 and the diode 257 which connects the upper terminal of the transformer 154. This connection includes a diode 263 to prevent current flow except toward the transistor 260. The emitter of the transistor 260 is connected to a negative branch 262. When the transistor 192 conducts the terminal 202 is elevated in potential and base current flows through the transistor 260 thereby effectively shunting any gate current from the controlled rectifiers 246 and 252.

Similarly, the base of the transistor 264 is connected through a usual current limiting resistor to the terminal 232, the emitter is connected to the branch bus 262 and the collector is connected through diodes to the gate circuits of the controlled rectifiers 250 and 254. Therefore, whenever the transistor 194 conducts, the transistor 264 is rendered conductive whereby the potential of the gates of the controlled rectifiers 250 and 254 are maintained at substantially the potential of the negative bus 176 and the controlled rectifiers 250 and 254 cannot be rendered conductive. With this arrangement, the conduction of the transistors 192 and 194 cannot be terminated if they are rendered conducting prior to the rendering of any of the controlled rectifiers 246, 250, 252 and 254.

The voltage detecting circuit 166 prevents an incorrect tripping of the breaker 4 by the operate circuit even though one or both of the polarizing voltages established by the transformers 142 and 152 should disappear. This circuit 166 includes the transistors 265, 266, 267 and 268. Transistor 265 controls the conduction of transistor 266, each of which has its emitter connected to negative branch bus 270. Base drive current for the transistor 265 is derived from the transformer 142 through the conductor 271 and diodes 272 and 273 and transistor 265 will conduct at all times as the transformer 142 is energized. Since the base of the transistor 266 is connected to the common connection of the resistor 269 and the collector of the transistor 265, the transistor 266 is normally maintained nonconducting. If however, the output voltage of the fault polarizing network 54 fails and the transistor 265 becomes nonconducting, the base of the transistor 266 will increase in potential, base current will flow and transistor 266 will conduct to shunt away any base drive to the transistor 216 from the terminals 208 and 238. Similarly, the transistors 267 and 266 are actuated in response to the presence or absence of the output signal from the three-phase fault polarizing network 56 to control the base drive signal to the transistor 216 from the terminals 220 and 240.

The amplifying network 8 is provided with input terminals which are connected through a current limiting resistor 276 to the base-emitter circuit of the transistor 278. Emitter-collector potential is applied to the transistor 278 from a suitable direct current source connected between the positive and negative busses 280 and 282. A diode 284 is connected between the emitter of the transistor 278 and the bus 280. A resistor 286 is connected between the collector of the transistor 278 and the negative bus 282. The potential across the resistor 286 is used to energize a control transformer 288 and for this purpose the primary winding 290 of the transformer has one end 291 connected through the bus 282 to the adjacent end of the resistor 286 and its other end connected through a Shockley type diode 292 and a current limiting resistor 294. Reverse current is prevented from flowing through the diode 292 by means of a diode 296 connected in antiparallel therewith. Preferably, a capacitor 298 has one terminal connected to the common terminal of the diode 292 and resistor 294 and its other terminal connected to the terminal 291 of the winding 290.

A secondary winding 300 of the transformer 288 is connected between the gate and cathode of a controlled rectifier 302 through a current limiting resistor 304. The anode of the rectifier 302 is connected through a current limiting resistor 306 to the positive bus 280 and its cathode is connected through the trip coil 7 and contacts 9 of the breaker to the negative bus 282. In order to limit any reverse voltage across the controlled rectifier 302 it may be and preferably is shunted by a Zener diode 308. A capacitor 310 connected in series with a current limiting resistor 312 are shunt connected with the relay 7 to permit a more rapid build-up of current through the controlled rectifier 302 than would occur through the inductive trip coil 7 by itself. This feature is shown and claimed in a copending application Ser. No. 422,297, filed Dec. 30, 1964, for A Control Device and assigned to the assignee as is this invention.

The fault or overcurrent network 18 (FIG. 3A) acts to provide an output signal at its output terminals 314 whenever the current signal through one of the conductors 32, 34 and 36 exceeds a predetermined magnitude greater than any normal current magnitude which flows in the protected line section 2. For this purpose, current quantities responsive to the current flowing through the line conductors 32, 34 and 36 are individually applied across the input terminals of full-wave rectifying networks 316, 318 and 320. These networks have their direct current output terminals individually connected together by resistors to permit individual voltages to be established across their individual output terminals in accordance with current flowing through the individual line conductors 32, 34 and 36. As illustrated these networks 316 and 318 and 320 are energized by current transformers 322, 324 and 326 separate from the current transformers of the transformer array 30. However, if desired, the current signals could be obtained from the array 30.

The positive output terminals of the networks 316, 318 and 320 are connected individually through rectifiers to a common terminal 328 and therefrom through a resistor 330 and a Zener diode 332 to the common negative terminal 334 of the networks 316, 318 and 320. The output terminals 314 of the overcurrent network 18 are connected to the two ends of the resistor 330. It will be appreciated that the voltage established at the positive and negative terminals 328 and 334 is that which corresponds to the conductor having the greatest current flow therethrough. As long as the magnitude of this potential is less than the breakover voltage of the Zener 332 no current will flow through the resistor 330 and there will be no output potential at the output terminals 314. When however this voltage exceeds that of the breakover voltage of the Zener diode 332, current will flow through the resistor 330 and an output potential will appear at the output terminals 314. If desired, voltage limiting means could be provided to limit the output voltage at the terminals 314 irrespective of the magnitude of the fault current flowing through the protected line section 2.

It is believed that the remainder of the details of construction may best be understood from a description of the operation of the apparatus which is as follows: When no fault exists within the reach of the relaying apparatus 12 the phase of the output voltages of the transformers 140, 142 and 152 will be as illustrated by the angular position of the vectors $E_0$, $E_{P3\theta}$ and $E_{P\theta\theta}$ of FIG. 4. If no fault current is flowing through the protected section 2 there will be no potential between the output terminals 314 of the overcurrent network 18. If a fault should occur, as for example at the location E as illustrated in FIG. 1, fault current will flow through the protected line section 2 and an output potential will appear across the output terminals 314 of the overcurrent network 18. This potential is applied to one of the input terminals of the OR network 19 which will cause the time delay 20 to start its timing function. As set forth above the timing interval is set for substantially the maximum time interval required to operate the output terminals of the actuating networks 16F and 16R.

The fault E is within the forward reach of the relay at station A and the phase of one of the polarizing voltages $E_{P\theta\theta}$ or $E_{P3\theta}$ will lag the phase of the operate voltage $E_0$ as indicated in FIGS. 5 and 6. If it is assumed that the fault is between the conductors 32 and 36 the polarizing voltage $E_{P\theta\theta}$ will lag the operate voltage $E_0$ and an output potential will appear across the output terminal 17F as is described more fully in the copending application of Calhoun.

The conduction of the transistors 192 and 194 and the consequent energization of the terminals 202 and 232 render the transistors 260 and 264, of the restraint squelch network 164, conducting to shunt gate current from the controlled rectifiers 246, 250, 252 and 254. This prevents the lagging potential from the line-to-line polarizing network from firing the controlled rectifiers 246 and 250 whereby the transistors 192 and 194 can maintain the transistor 216 conducting and an output potential at the output terminals 17F.

With the terminals 17F energized, the upper terminal of the AND network 14 is energized as well as the upper input terminal of the OR network 19 and the NOT network 23. The energization of the terminals 17F can occur either immediately upon the occurrence of the fault E or may be delayed as much as one-half cycle thereafter depending upon when the fault occurs in the operating cycle of the network 16R or 16F. If the fault occurs at a time when the transistors 192 and 194 are rendered conducting at a time when the respective controlled rectifiers 246 and 250 are not supplied with gate current, the energization of the output terminal 17F will be substantially instantaneously as indicated in FIG. 7 by the zero degree reference mark. The time delay will progressively increase as indicated by FIG. 7 from the substantially immediate energization (0 and 180 degrees) to substantially a half cycle delay (180°–360°) as the occurrence of the fault is delayed.

Assuming that the fault occurred somewhere intermediate 0 and 180° as indicated in FIG. 7, the occurrence of the fault will have energized the output terminals 314 of the overcurrent network 18 and the OR network 19 will have already initiated the timing out of the time delay network 20. By the time that the time delay network 20 times out, the output terminals 17F of the trip coil actuating network 16F will have been actuated so that at or before the time out of the time delay 20 the upper input of the AND network 14 will be energized. When the delay 20 times out, and no signal has been received from the remote station, all of the inputs of the AND network 14 will be energized and network 14 will actuate the trip coil 7 and open the breaker.

Since the fault E is external, as indicated in FIG. 1, the rearwardly reached reaching fault sensing network 22RB at the remote station B will have actuated the transmitter network 16RB whereby the transmitter 21B will transmit a continuous carrier signal to the receiver 24A prior to the timing out of the delay 20A. Immediately upon reception of the carrier signal by the receiver 24A the NOT network 26A will be actuated and remove the input signal on the lowest input terminal of the AND network 14. With the input signal so removed, the AND network 14 is prevented from actuating the breaker trip amplifying network 8A and the breaker 4A will not be actuated to disconnect the protected line section from the power network 1 even though the fault is within the forward reach of the relay A.

When the fault is internal, as for example at I, the transmitters 21A and 21B must be prevented from transmitting their output signals. This can be assured by the NOT circuits 23A and 23B which are actuated by the actuating networks 16FA and 16FB respectively. When so actuated, these NOT circuits remove one input to the AND circuits 25A and 25B. Therefore even if one or more of the auxiliary equipments 27A and 27B and the networks 16RA and 16RB should call for operation of one or both of the transmitters 24A and 24B, the lack of the output signal of the affected NOT circuit would prevent the associated AND circuit from causing the associated transmitter to transmit its signal.

With no signal from the transmitter 21B, the receiver 24A will not be actuated and the NOT circuit 26A will not remove the operate signal from the slower input of the AND network 14A. Therefore upon the timing out of the delay 20A, the AND network 14A will be actuated to operate the trip amplifier network 8A to open the breaker 4A. Similar conditions will prevail at the remote end and the breaker 4B will open.

It will be appreciated by a reference to FIG. 8 that the time required for the breaker operaton is substantially a half cycle as measured by the frequency of the power in the power network or approximately 8 milliseconds, the time delay for which the time delays 20A and 20B have been set. In practice, the output of the AND network 14A will not become effective for about 4 milliseconds after all of its inputs are energized to allow for carrier propagation. This time is applicable to increase trip time illustrated in both FIG. 7 and FIG. 8. The breakers are therefore actuated in the event of an internal fault in substantially 12 milliseconds irrespective of the time of the occurrence of the fault, and yet, if the fault is external, there is sufficient time for the reverse reach of the relay at the remote end of the protected line section to prevent actuation of the local relay.

FIG. 6 illustrates by means of vectors the phase relationship between the operate voltage $E_0$ and the phasing voltage $E_{P3\phi}$ in the event of a three-phase fault at either the point I or the point E. It will be appreciated that in this event vector $E_0$ laeds $E_{P3\phi}$ and the controlled rectifiers 252 and 254 will not be rendered conductive to shunt the drive current from the outputs 17F or 17R depending upon the fault location. Otherwise the operation of the relaying apparatus is as described. A more detailed description of the phasing which occurs by line-to-line faults appears in the copending Calhoun application.

Although the invention has been described with reference to a single embodiment thereof, numerous modifications are possible and it is desired to cover all of the modifications falling within the spirit and scope of the invention.

What is claimed and is desired to be secured by United States Letters Patent is as follows:

1. In a relaying apparatus for protecting a section of a power transmission line, a fault detecting network having input means adapted to be connected to said line, said fault network having an output actuated as a consequence of the occurrence of fault on said line, a substantially instantaneously operating fault responsive network having an input means adapted to be connected to said line and an output energized as a consequence of the flow of fault current in said line, a breaker tripping network, an AND circuit having three inputs and an output, an OR circuit having two inputs and an output, a time delay circuit having an input and an output, circuit means connecting said output of said fault detecting network to a first of said AND circuit inputs and to a first of said OR circuit inputs, circuit means connecting said output of said fault responsive network to the second of said OR circuit inputs, circuit means connecting said output of said OR circuit to said input of said time delay circuit and said output of said time delay circuit to a second of said AND circuit inputs, a NOT circuit having an input and an output circuit means connecting said NOT circuit output to the third of said AND circuit inputs, and a control apparatus connected to said input of said NOT circuit for finally determining whether said output of said AND circuit is to be energized subsequently to the actuation of said fault detecting network.

2. The combination of claim 1 in which said fault detecting network includes pulsating means controlling the actuations of its said output, the time interval between the actuations of said output of said fault detecting network and the application of a fault responsive signal to its said input means being a function of the portion of said pulse that said fault signal occurs.

3. The combination of claim 2 in which the time interval of said time delay circuit is substantially the interval reauired for one of the pulses of said pulsating means.

4. In a relaying apparatus for protecting an alternating potential power transmission line which extends between first and second locations and forms part of a power distributing network, a first distance relay having an input means adapted to be connected to said power network at said first location and having an output, a second distance relay having an input means adapted to be connected to said power network at said second location and having an output, each said distance relay being operable to actuate its said output in response to a fault in said power network, a detecting network having an input means connected to said power network and an output means, said detecting network being operable to actuate its said output in response to fault operations of said power network but not operable to actuate its said output in response to normal operation of said power network, a time delay means having an input means and an output means and means determining a time interval between the actuation of its said input means and of its said output means, said interval of said delay means being substantially that of the longest interval required by said relays to alter the energization of their said outputs in response to the occurrence of a fault in said power network, an AND network having a plurality of inputs and an output, said AND network being operable to actuate its said output means solely when all of said input means are actuated, first circuit means connecting said output of said first relay and said output of said detecting network to said input means of said delay means for actuation of said delay means in response for actuation by at least one of said first relay and said detecting network, second circuit means connecting said output of said first relay to one of said inputs of said AND network, said first relay being effective in response to a fault in said power network to actuate said one input of said AND network, a third circuit means connecting said output means of said delay network to a second of said inputs of said AND network, said delay network being effective upon the actuation of its said output means to actuate said second input of said AND network, control means connected to and normally actuating a third of said inputs of said AND network, and a fourth means operably interconnecting said output of said second relay to said control means, said second relay being effective in response to a fault in said power network to render said control means ineffective to actuate said third input of said AND network.

5. The combination of claim 4 in which each said distance relay includes means producing two series of pulses, the pulses of each said series being at a fixed frequency with respect to the frequency of said power network and at first phase angle with respect to each other when said relay is actuated by a non-faulted operation of said power network and at a second phase angle when said relay is actuated by a faulted operation of said power network, each said network being effective to actuate its said output solely at said second phase angle, each said network being effective to actuate its said output at intervals which vary in duraion for a minimum interval to a maximum interval depending upon the time of the occurrence of the fault in said power network, said time interval of said delay being of the same duration as said maximum interval of said relay.

6. In a relaying system for protecting a transmission line which connects a first portion of an alternating potential power network at a first location to a second portion of such power network at a second location; first and second relaying apparatuses located at said first and second locations respectively; each said apparatus comprising a distance relay, a detecting apparatus, an OR circuit, a time delay circuit, a NOT circuit, and an AND circuit, and a circuit breaker; said circuit breaker of said first and second apparatuses normally being effective to connect said transmission line to said first and second portions of said power network respectively; each said circuit breaker having actuated contacts connecting the portion of said line with which it is associated to said power network and means for causing it to open its said contacts and thereby disconnect said respective portion of said line from said power network; each said distance relay having input means and first and second output means respectively energized within first predetermined time intervals subsequent to first and second fault signals respectively being applied to its respective said input means; each said detecting apparatus having an input means and an output means energized within a second predetermined time interval subsequent to an abnormal signal being applied to its respective said input means; each said time delay circuit having an input and an output actuated at the end of a third predetermined time interval subsequent to the actuation of its respective said input means; each said AND circuit having first and second and third inputs and an output actuated solely when all of its said inputs are actuated; each said relaying apparatus including circuit means connecting said first output means of its said distance relay and its said detecting apparatus through its said OR circuit and its time delay circuit to said first input of its said AND circuit, circuit means connecting said first output means of its said distance relay to said second input of its said AND circuit in shunt with its said OR circuit and its said time delay, circuit means connecting its said NOT circuit to said third input of its said AND circuit, and circuit means connecting said output of its said AND circuit to said actuated means of its said breaker for causing said associated breaker to open its said contacts; means operatively connecting said second output of said relay of said first relaying apparatus to said NOT circuit of said second relaying apparatus whereby said first-mentioned NOT circuit is prevented from actuating said AND circuit of said first relaying apparatus in response to the actuation of said second output of said relay of said second relaying apparatus; means operatively connecting said second output of said relay of said second relaying apparatus to said NOT circuit of said first relaying apparatus whereby said just-mentioned NOT circuit is prevented from actuating said AND circuit of said second relaying apparatus in response to the actuation of said second output of said relay of said first relaying apparatus; said inputs of said relays of said first and second relaying apparatus being connected to said power network adjacent its said first and second portions respectively; said relay of said first relaying apparatus being operable to actuate its said first output in response to a fault anywhere in said transmission line and in a first selected portion of said power network external to said line and to actuate its said second output in response to a fault in a second selected portion of said power network external to said line; said relay of said second relaying apparatus being operable to actuate its said first output in response to a fault anywhere in said transmission line and in a third selected portion of said power network external to said line and to actuate its said second output in response to a fault in a fourth selected portion of said power network external to said line; said fourth selected portion including said first selected portion and said second selected portion including said third selected portion.

7. The combination of claim 6 in which each of said distance relays includes structure which varies its said first predetermined time intervals from a minimum to a maximum magnitude depending upon the instant in the operating cycle of said power network that a fault occurs, in which the magnitude of said second time interval of said detecting apparatus is substantially equal to said minimum magnitude of said first predetermined time interval, and in which the magnitudes of said third predetermined time interval is substantially equal to the maximum magnitudes of said first predetermined time interval.

References Cited
UNITED STATES PATENTS

| | | | |
|---|---|---|---|
| 3,144,586 | 8/1964 | Gambale | 317—36 |
| 3,163,802 | 12/1964 | Seguin et al. | 317—36 |
| 3,192,442 | 6/1965 | Warrington | 317—36 |
| 3,201,651 | 8/1965 | Calhoun | 317—36 |
| 3,303,390 | 2/1967 | Sonnemann | 317—36 |

MILTON O. HIRSHFIELD, *Primary Examiner.*

R. V. LUPO, *Assistant Examiner.*